United States Patent
Yang et al.

(10) Patent No.: US 11,430,182 B1
(45) Date of Patent: Aug. 30, 2022

(54) CORRECTING OR EXPANDING AN EXISTING HIGH-DEFINITION MAP

(71) Applicant: Pony AI Inc., Grand Cayman (KY)

(72) Inventors: Mengda Yang, Sunnyvale, CA (US); Yuyang Ding, Fremont, CA (US); Ruimeng Shi, Beijing (CN)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 17/196,679

(22) Filed: Mar. 9, 2021

(51) Int. Cl.
| | | |
|---|---|---|
| *G06T 17/20* | (2006.01) | |
| *G06T 3/00* | (2006.01) | |
| *G01S 17/89* | (2020.01) | |
| *G06T 19/20* | (2011.01) | |

(52) U.S. Cl.
CPC ........... *G06T 17/20* (2013.01); *G01S 17/89* (2013.01); *G06T 3/0068* (2013.01); *G06T 19/20* (2013.01); *G06T 2219/2004* (2013.01); *G06T 2219/2016* (2013.01)

(58) Field of Classification Search
CPC ....... G06T 17/20; G06T 3/0068; G06T 19/20; G06T 2219/2004; G06T 2219/2016; G01S 17/89
See application file for complete search history.

(56) References Cited

U.S. PATENT DOCUMENTS

| | | | | |
|---|---|---|---|---|
| 10,891,744 | B1* | 1/2021 | Wyffels | G01S 17/89 |
| 2007/0257908 | A1* | 11/2007 | Chang | G06F 16/51 |
| | | | | 345/419 |
| 2016/0300375 | A1* | 10/2016 | Beckett | G06T 3/4092 |
| 2018/0330149 | A1* | 11/2018 | Uhlenbrock | G06T 7/001 |
| 2019/0206122 | A1* | 7/2019 | Zhan | G01S 17/89 |
| 2019/0323844 | A1* | 10/2019 | Yendluri | G01C 21/28 |
| 2020/0182626 | A1* | 6/2020 | He | G01S 17/89 |
| 2020/0379089 | A1* | 12/2020 | Morarity | G01S 7/4817 |
| 2020/0393261 | A1* | 12/2020 | Zhang | G01C 21/3492 |
| 2021/0223048 | A1* | 7/2021 | Huang | G06T 7/11 |

* cited by examiner

*Primary Examiner* — Daniel F Hajnik
(74) *Attorney, Agent, or Firm* — Sheppard Mullin Richter & Hampton LLP

(57) ABSTRACT

A computing system includes one or more processors and a memory storing instructions that, when executed by the one or more processors, cause the system to perform operations. The operations include determining that a portion of an existing map is to be updated; obtaining a point cloud acquired by one or more Lidar sensors corresponding to a location of the portion; converting the portion into an equivalent point cloud; performing a point cloud registration based on the equivalent point cloud and the point cloud; and updating the existing map based on the point cloud registration.

20 Claims, 12 Drawing Sheets

CORRECTING OR EXPANDING AN EXISTING HIGH-DEFINITION MAP

BACKGROUND

Existing high-definition (HD) maps need to be updated when changes occur in an environment. For example, if a new building, road, or detour has been constructed, the HD maps need to be updated to reflect such new constructions so that vehicles can accurately and reliably navigate. Corrections of existing high-definition (HD) maps on a scale of a city may be infeasible using global position satellite (GPS), global navigation satellite system (GNSS), or GNSS-IMU (inertial measurement unit) data due to outages and limits in accuracy of GPS. GPS receivers require a continuous, clear line of sight to multiple satellites in the sky. However, in an environment of a city, signals from the GPS receivers may be degraded and discontinuous because dense urban features such as buildings, tunnels, and underground structures obstruct the line of sight to the satellites. Moreover, updated sensor data from other sensors such as Lidar sensors cannot simply be plugged into the HD maps because the updated sensor data may have a different format from the HD maps. Thus, an efficient way to update HD maps is needed.

SUMMARY

Described herein, in some embodiments, is a computing system configured to modify an existing map, the computing system comprising: one or more processors; and a memory storing instructions that, when executed by the one or more processors, cause the system to perform operations. The operations may include determining that a portion of an existing map is to be updated; obtaining a point cloud acquired by one or more Lidar sensors corresponding to a location of the portion; converting the portion into an equivalent point cloud; performing a point cloud registration based on the equivalent point cloud and the point cloud; and updating the existing map based on the point cloud registration.

In some embodiments, the performing of the point cloud registration comprises: determining a rigid transformation to be performed on the equivalent point cloud, the rigid transformation including a rotation and a translation to form a closest alignment, out of all possible alignments, between the equivalent point cloud and the point cloud.

In some embodiments, the existing map comprises a static map, the static map including cells arranged in tiles; and the conversion of the portion into an equivalent point cloud comprises: representing each occupied point in the tiles as a point in a frame of the equivalent point cloud.

In some embodiments, the conversion of the portion into an equivalent point cloud comprises: combining the tiles and neighboring tiles into a single frame.

In some embodiments, the instructions further cause the one or more processors to perform: determining an equivalent pose of the portion; and the performance of the point cloud registration is based on the equivalent pose.

In some embodiments, the equivalent point cloud comprises an array; and the instructions further cause the one or more processors to perform: in response to converting the portion into an equivalent point cloud, dynamically allocating a memory based on a size of the equivalent point cloud; and storing the equivalent point cloud into the memory.

In some embodiments, the determination that a portion of an existing map is to be updated comprises detecting a difference in a feature between the portion and sensor data of a corresponding location, the sensor data comprising Lidar, camera, or radar data; and determining that the difference exceeds a threshold amount.

In some embodiments, the instructions further cause the one or more processors to perform: obtaining a second point cloud acquired by the one or more Lidar sensors corresponding to the location of the portion; performing a second point cloud registration between the point cloud and the second point cloud to obtain a second registered point cloud; and wherein: the performing of the point cloud registration is between the second registered point cloud and the equivalent point cloud.

In some embodiments, the instructions further cause the one or more processors to perform: in response to performing the point cloud registration, determining a validity of the point cloud registration by comparing coordinate differences between common features of the existing map and the updated existing map.

Various embodiments of the present disclosure provide a method or non-transitory computer medium implemented by a computing system as described above.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 2A-2D illustrates an example of updating the existing map by converting the existing map to an equivalent point cloud and performing point cloud registration.

FIGS. 3A-3B and 4A-4B illustrate an exemplary implementation of a point cloud registration process, in accordance with an example embodiment of the present disclosure.

DETAILED DESCRIPTION

Data from existing HD maps, such as static maps, may be updated from GPS signals. However, GPS signals may not always be present or reliable in large cities. Thus, when GPS data is unavailable or compromised, other sensor data is required to update or expand the existing HD maps. The other sensor data may include Lidar data. However, before Lidar data cannot be directly inserted into the existing HD maps because the existing HD maps are not in a point cloud format. Thus, an existing HD map must be made compatible with the Lidar data by conversion into an equivalent point cloud. The equivalent point cloud may be an equivalent representation of the existing HD map, and not originated from Lidar data.

By updating or expanding the existing HD maps, vehicles such as autonomous or semi-autonomous vehicle can rely on the updated HD maps to accurately and precisely navigate on a road. Otherwise, if features such as landmarks, buildings, roads, and/or traffic signs on a road are inaccurate, vehicles may not have accurate information with which to make navigation decisions. Using the updated HD maps, a processor on the vehicles can detect or determine a presence of different objects or entities in the surrounding environment to assist the vehicles, or another vehicle, in performing navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, and automated distance control.

Embodiments described herein provide an apparatus and/or a computing system to modify an existing HD map. The computing system, in some embodiments, may be present on a vehicle or offloaded to a site remote from the vehicle, while receiving Lidar sensor data from the vehicle.

Figure 1A:
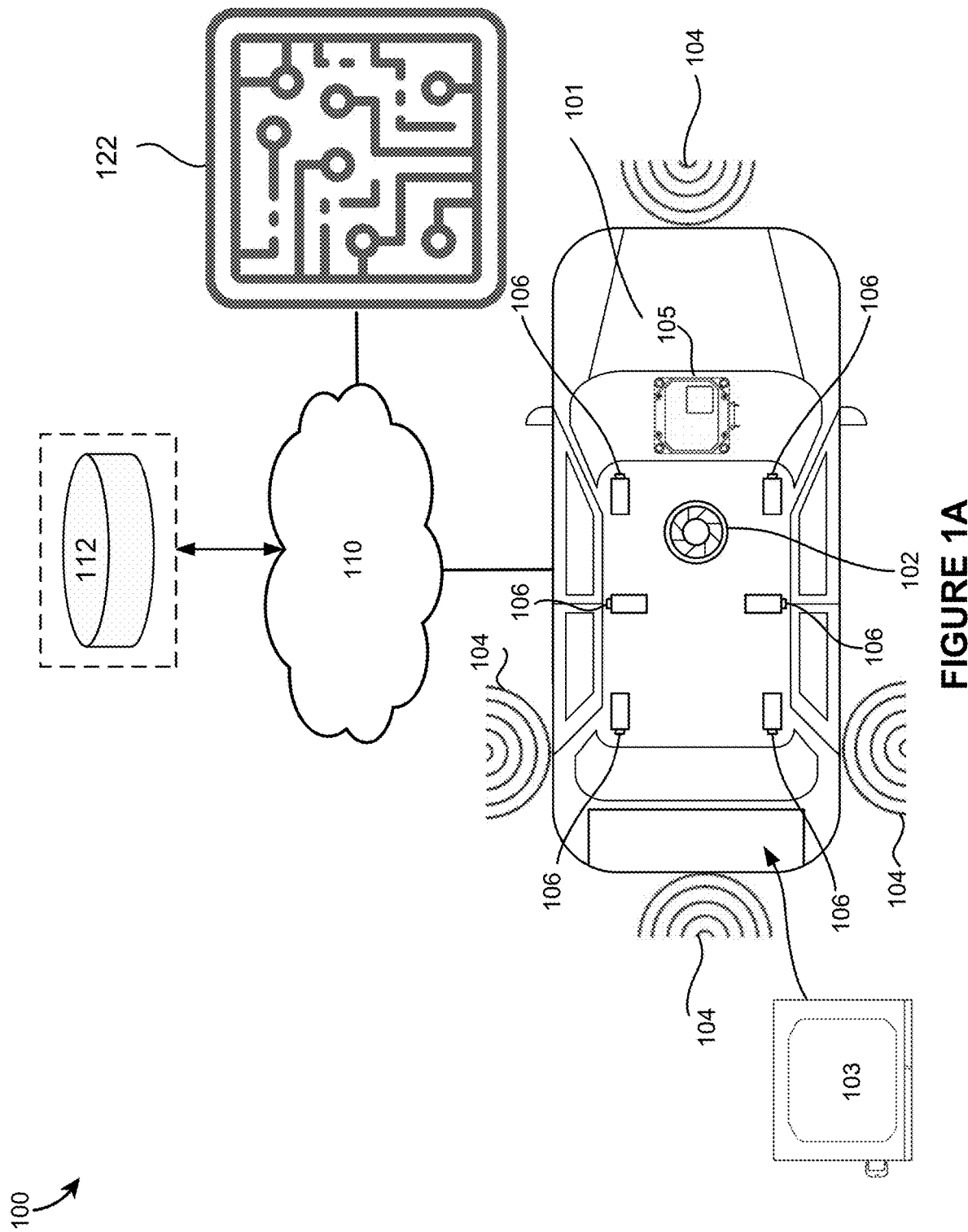
FIG. 1A illustrates an example environment of a system that updates an existing map, according to an embodiment of the present disclosure.

FIG. 1A illustrates an example environment 100 of a system that updates an existing map, such as a HD-map, according to an embodiment of the present disclosure. In FIG. 1A, a vehicle 101 such as an autonomous vehicle may include sensors such as Lidar sensors 102, an inertial measurement unit (IMU) 103, radar sensors 104, a GPS or GNSS sensor (hereinafter "GPS sensor") 105, cameras 106, accelerometers, gyroscopes, magnetometers, and FIR (far infrared) sensors to detect and identify objects in a surrounding environment. In some embodiments, the IMU 103 may include accelerometers and gyroscopes, and optionally, magnetometers. The sensor data may include pictorial or image data such as pictures or videos, audio data, audiovisual data, timestamp data, and/or other data indicating a position and/or pose of the vehicle 101 captured in either real-time or with a time delay. For example, data from the Lidar sensors 102, the IMU 103, the GPS sensor 105, and the timestamp data can be used to localize the vehicle 101 at different times while generating a city-scale map of the environment. The vehicle 101 can also include myriad actuators to propel and navigate the vehicle 101 in the surrounding based on the generated map. Such actuators may include, for example, any suitable electro-mechanical devices or systems such as actuators including drive-by-wire (DBW) actuators to control a throttle response, a braking action, a steering action, etc.

The environment 100 may also include one or more servers 112 accessible to a computing system 121. The computing system 121 may be integrated into the vehicle 101 or may be remote from the vehicle 101, but still receiving sensor data from the vehicle 101 and/or other vehicles. The one or more servers 112 may store frames of data from the sensors of the vehicle 101. In some embodiments, the one or more servers 112 may store integrated or fused data from the sensors. The one or more servers 112 may be accessible to the computing system 121 either directly or over the communication network 110. In some instances, the one or more servers 112 may include federated data stores, databases, or any other type of data source from which data may be stored and retrieved, for example. In some implementations, the one or more servers 112 may include point clouds which may be registered, or post-processed global navigation satellite system (GNSS)-inertial navigation system (INS) data. In general, a user operating a computing device can interact with the computing system 121 over the communication network 110, for example, through one or more graphical user interfaces and/or application programming interfaces. The computing system 121 may include one or more processors 122 such as a graphics processing unit (GPU) or a central processing unit (CPU). The computing system 121 may include, for example, an integrated circuit containing a high-performance microprocessor or microcontroller such as a graphical processing unit (GPU) capable of executing algorithms that require processing large blocks of data (e.g., sensor data) in parallel, for example. In some example embodiments, the computing system 121 may include multiple types of processing units (e.g., GPUs, central processing units (CPUs), application-specific integrated circuits (ASICs), field-programmable gate arrays (FPGAs), etc.) potentially distributed across multiple computing devices and in communication with one another via one or more communication buses. The functions of the computing system 121 will be described further in the subsequent figures. Engines/program modules as described below can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Figure 1B:
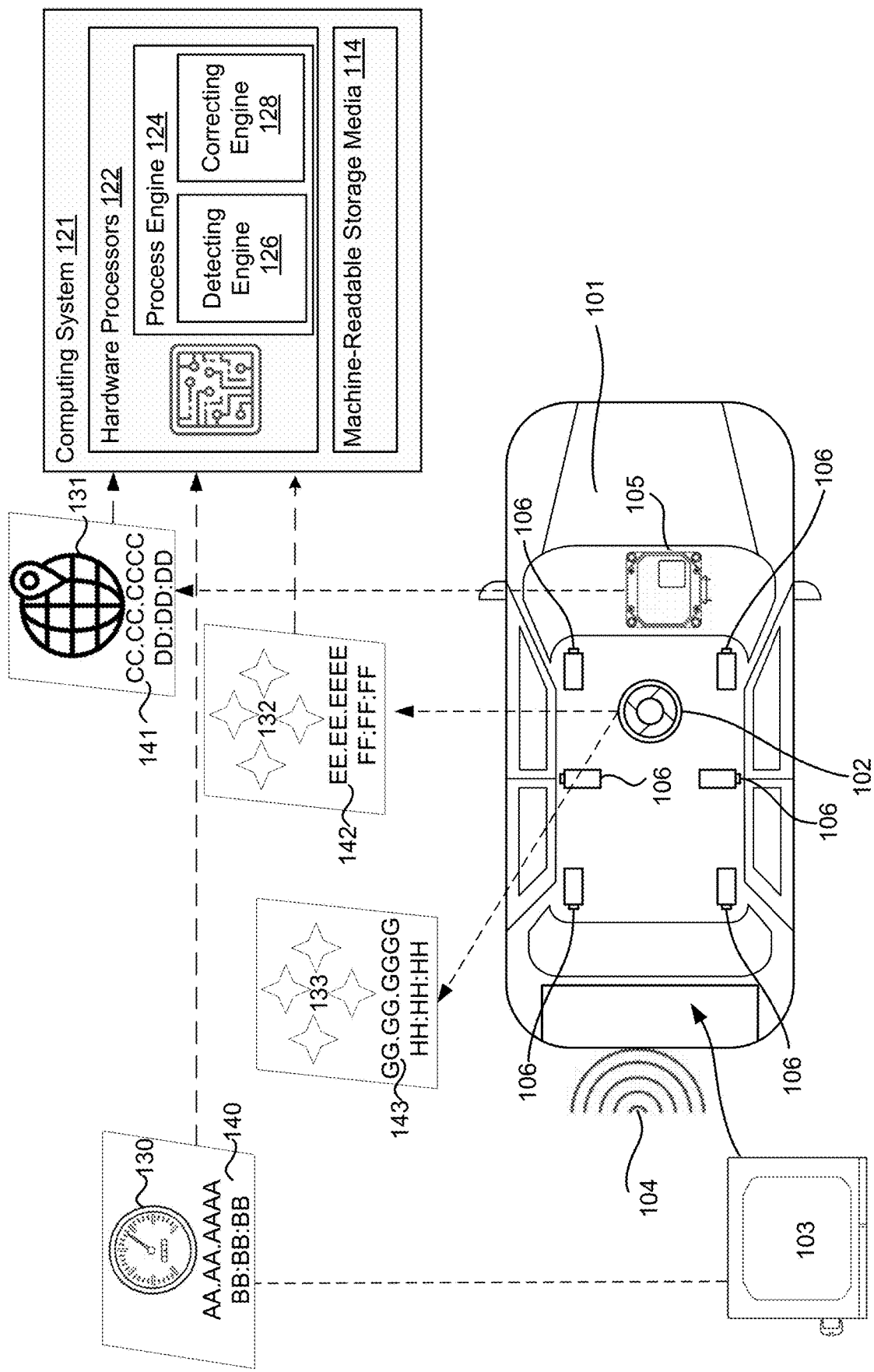
FIG. 1B illustrates a hybrid data flow and block diagram that depicts a system that updates an existing map, in accordance with an example embodiment of the present disclosure.

FIG. 1B illustrates a hybrid data flow and block diagram that illustrates a process of acquiring sensor data, determining whether an existing map requires updating, and updating the existing map in response to such determination, in accordance with an example embodiment. In FIG. 1B, the computing system 121 may include the one or more hardware processors 122, which may include, at least, a process engine 124. The computing system 121 may also include machine readable storage media 114 that includes instructions which may be executed by the one or more hardware processors 122 to perform the acquisition of sensor data and updating the existing map. The process engine 124 may further include a detecting engine 126 that determines whether an existing map requires updating or expansion, and a correcting engine 128 that may confirm whether the existing map requires updating and/or updates the existing map. In some embodiments, functions described with respect to the detecting engine 126 and the correcting engine 128 may be performed by a single processor or any number of processors. For example, functions described with respect to the detecting engine 126 and the correcting engine 128 may be may be combined or integrated into a single processor, and some or all functions performed by one or more of functions described with respect to the detecting engine 126 and the correcting engine 128 may be may not be spatially separated, but instead may be performed by a common processor. In some embodiments, functions described with respect to the detecting engine 126 and the correcting engine 128 may be implemented in separate computing systems. For example, any or all of the functions of the detecting engine 126 may be performed by the vehicle 101 while any or all of the functions of the correcting engine 128 may be performed by a computing system remote from the vehicle 101.

In summary, the detecting engine 126 may detect or determine that features from an existing map have been changed or are being changed, or that an area of an existing map is to be expanded. For example, the detecting engine 126 may receive an alert that a new road or other feature is being constructed or removed or that other features in the existing map are being changed. In other examples, the detecting engine 126 may detect, from sensor data acquired by the vehicle 101, that a feature in the existing map may not conform with the sensor data. The sensor data may include any data acquired from any sensors of the vehicle 101, including the Lidar sensors 102, the radar sensors 104, and the cameras 106. Such a detection by the detecting engine 126 of a potential mismatch between the map data and the sensor data may be confirmed or further validated by the correcting engine 128, as described below.

Next, the correcting engine 128 may confirm whether the features are indeed being changed and/or perform such changes. The correcting engine 128 may convert a portion of an existing map into an equivalent point cloud. The correcting engine 128 may perform point cloud registration on the equivalent point cloud with respect to a point cloud captured by the Lidar sensor 102, such as a point cloud 132, so that the portion of the existing map may be compatibly compared with the point cloud 132. In other words, the equivalent point cloud may have a same format and orientation compared to the point cloud 132 so that common features and differences may be discerned. The correcting engine 128 may determine or confirm whether features in the point cloud 132 differ from the corresponding portion of an existing map. In some examples, other sensor data such as odometry data 130 from the IMU 103 and odometry data 131 from the GPS sensor 105 may be fused to the point cloud 132 so that the point cloud 132 is also augmented with estimated location information. The estimated location may be compared with a location of the portion of an existing map as a sanity check to determine or confirm whether the point cloud 132 and the corresponding portion of an existing map are indeed from a common location. The point cloud 132 may have a timestamp 102. The odometry data 130 and 131 may have timestamps 140 and 141, respectively, from the IMU 103 and the GPS sensor 105, respectively. If the correcting engine 128 confirms that one or more features of the point cloud 132 differ from a corresponding portion of an existing map, the correcting engine 128 may correct the existing map by updating the equivalent point cloud based on the point cloud 132 and reconverting the updated equivalent point cloud to a map format.

In some examples, if the detecting engine 126 determines that an existing map has features that are to be updated or that fail to match sensor data acquired from sensors of the vehicle 101, the correcting engine 128 may acquire or receive additional point clouds such as a second point cloud 133 having a timestamp 143, from the Lidar sensor 102, to gather more data about the potentially different features between the point cloud 132 and features in the existing map. The additional point clouds may aid in confirming or further elucidating the particular differences. The point cloud 132 and the additional point clouds may be registered, either by the correcting engine 128 or already have been registered before being acquired by the correcting engine 128, according to loop closure constraints between the point cloud and the additional point clouds. During the registration process, loop closure constraints may infer or estimate loop closures from common features such as buildings, roads, trees, signs, or other landmarks identified among the point cloud 132 and the additional point clouds. The correcting engine 128 may further incorporate constraints from the odometry data 130 and/or 131 that indicate a position and attitude of the vehicle 101 at times when the point cloud 132 and additional point clouds such as the second point cloud 133 were captured, as well as a covariance matrix indicating a confidence level or accuracy of each estimation. Such constraints may, for example, require that the vehicle 101 be at or near a same location, within a threshold distance, and/or at a same orientation, at the times associated with the inferred or estimated loop closures. The point cloud 132 and the second point cloud 133 may include any of 2D, 3D, and/or 2D/3D fused Lidar data. Two point clouds are shown for illustration, but any number of point clouds may be generated. In such a manner, the point cloud 132 may be augmented with additional point clouds such as the second point cloud 133 to elucidate certain features. Further details regarding point cloud registration are described in application Ser. No. 17/124,444, filed on Dec. 16, 2020, which is hereby incorporated by reference in its entirety.

FIGS. 2A-2D illustrate an implementation of the correcting engine 128, in which the correcting engine 128 performs processing onto an existing portion 202 of a map to render the existing portion 202 as a point cloud. The detecting engine 126 may determine that the existing portion 202 of the map is to be updated or expanded. The existing portion 202 may be from a same location as a captured Lidar frame, such as, the point cloud 132 and/or the point cloud 132 combined with the second point cloud 133 via registration. The correcting engine 128 may update the existing portion 202 to match features of the captured Lidar frame. The existing portion 202 may be represented in a form of a tile 222 that includes one or more occupied points such as an occupied point 223 corresponding to a feature. Each tile may be 2-dimensional and represent physically occupied space in real world divided by cubic grids. Occupied grids having static obstacles may be represented as 3-dimensional points indicating a relative coordinate to the origin of the map. The 3-dimensional points may be organized into a 3 by N matrix, wherein N is a number of points. Each tile may be indexed by a horizontal position of an upper left corner of that tile.

Figure 2A:
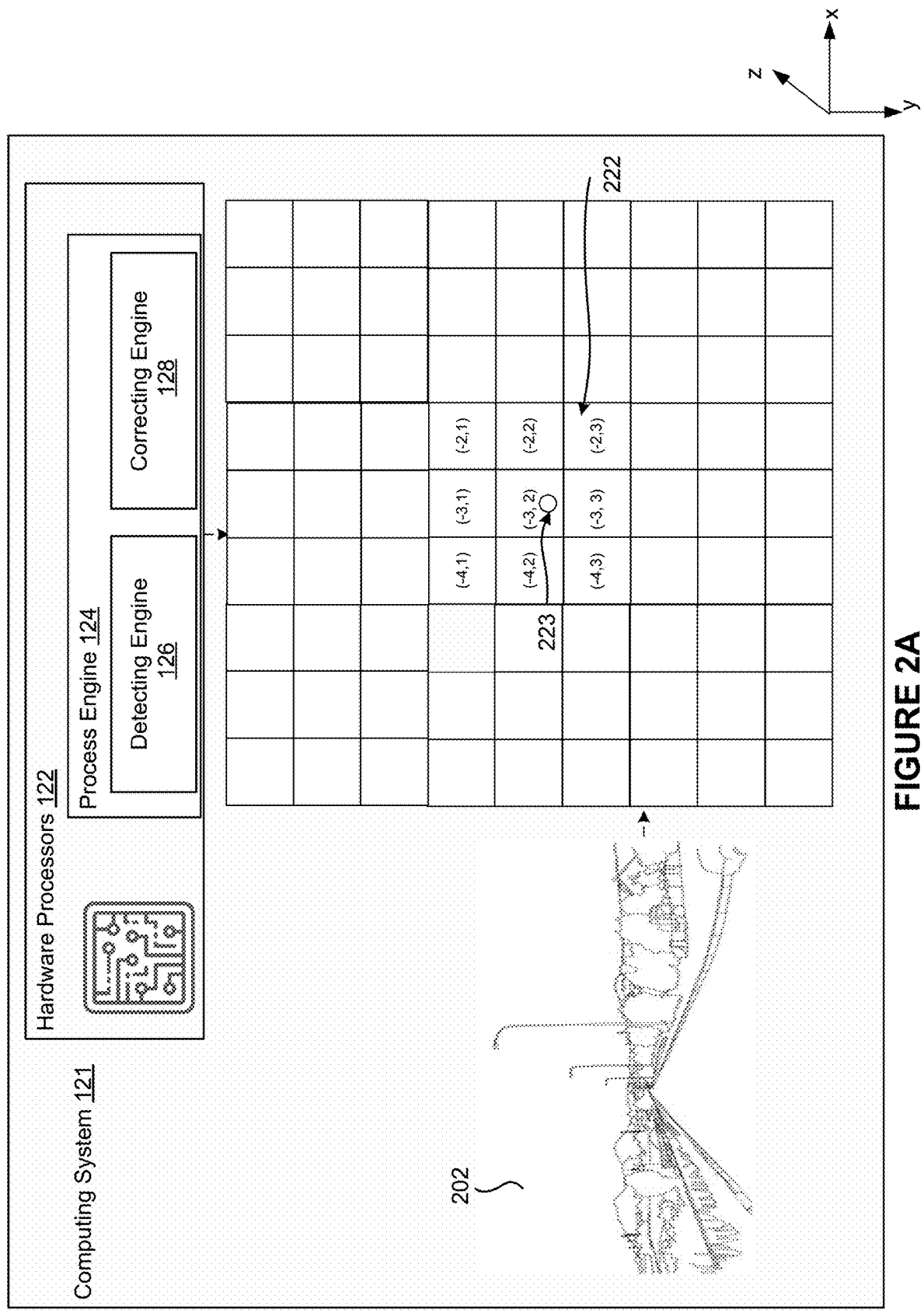
FIGS. 2A-2D illustrates an implementation of the computing system shown in accordance with FIGS. 1A-1B, in accordance with an example embodiment of the present disclosure. In particular.

Each tile may include multiple cells. For illustrative purposes, the tile 222 is illustrated to include nine cells in FIG. 2A, and surrounded by neighboring tiles that each include nine cells, although each of the tiles including the tile 222 may include any number of cells. As shown in FIG. 2A, the tile 222 may include the cells represented by coordinates (−4, 1), (−3, 1), (−2, 1), (−4, 2), (−3, 2), (−2, 2), (−4, 3), (−3, 3), and (−2, 3).

Figure 2B:
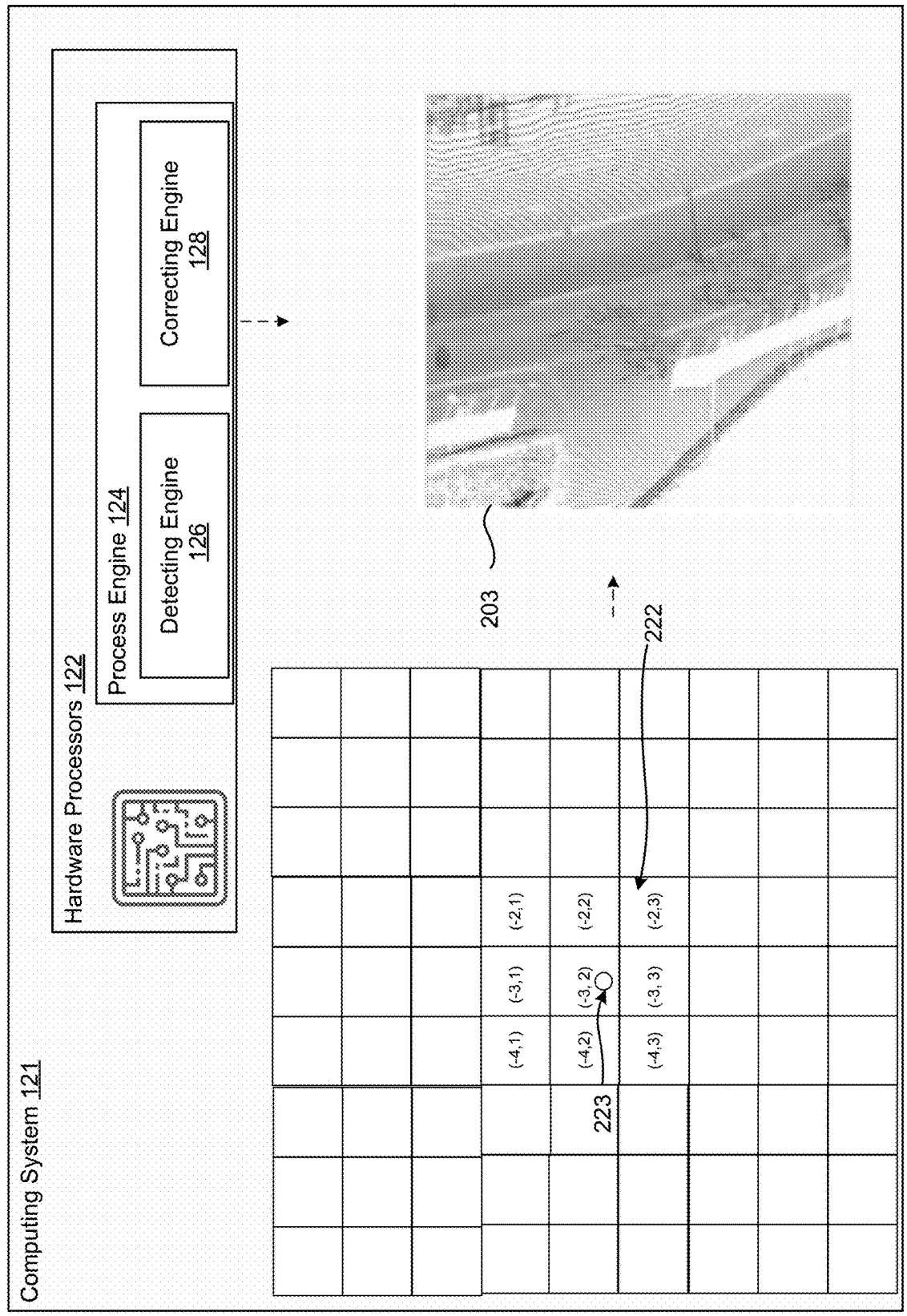

The existing portion 202 as represented by the tile may be converted to an equivalent point cloud 203 as illustrated in FIG. 2B, so that the equivalent point cloud 203 would have a same format as the captured Lidar frame to enable an update to the existing portion 202. The equivalent point cloud 203, in some embodiments, may represent a single frame of data. Thus, the equivalent point cloud 203 is not originated from a Lidar sensor, but has the same format as data captured from a Lidar sensor. In some embodiments, neighboring tiles surrounding the tile 222 may also be converted as part of the frame of the equivalent point cloud 203 to ensure that an entire region is fully updated. As illustrated in FIG. 2A, in exemplary scenarios, eight surrounding tiles, or a total of nine tiles, may be converted to an equivalent point cloud. Each occupancy point, such as the point 223, of the tile 222 and the surrounding tiles may be mapped to a corresponding point on the equivalent point cloud 203. A memory may be dynamically allocated based on a size of the equivalent point cloud 203 to store the equivalent point cloud 203.

Figure 2C:
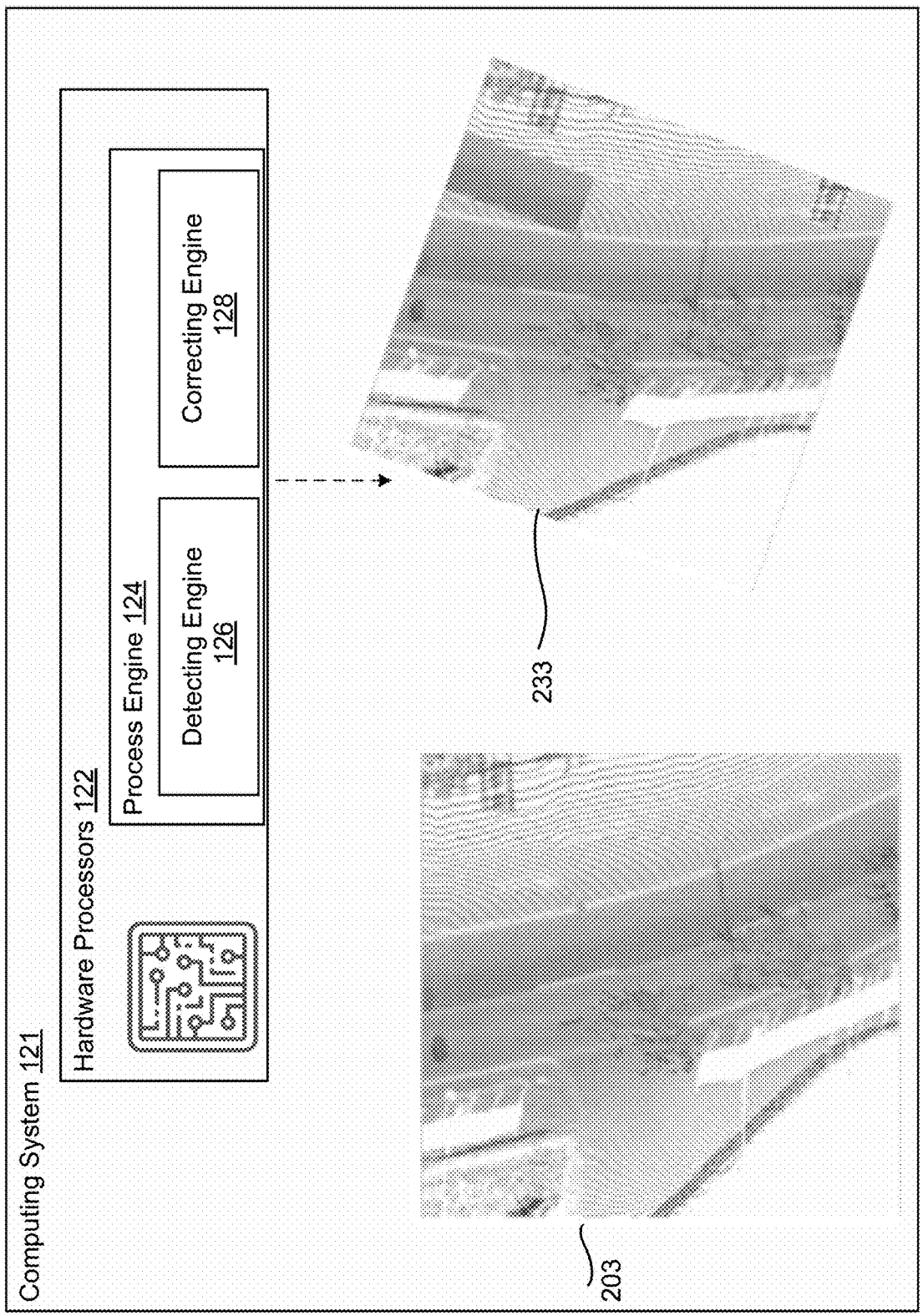
Figure 2D:
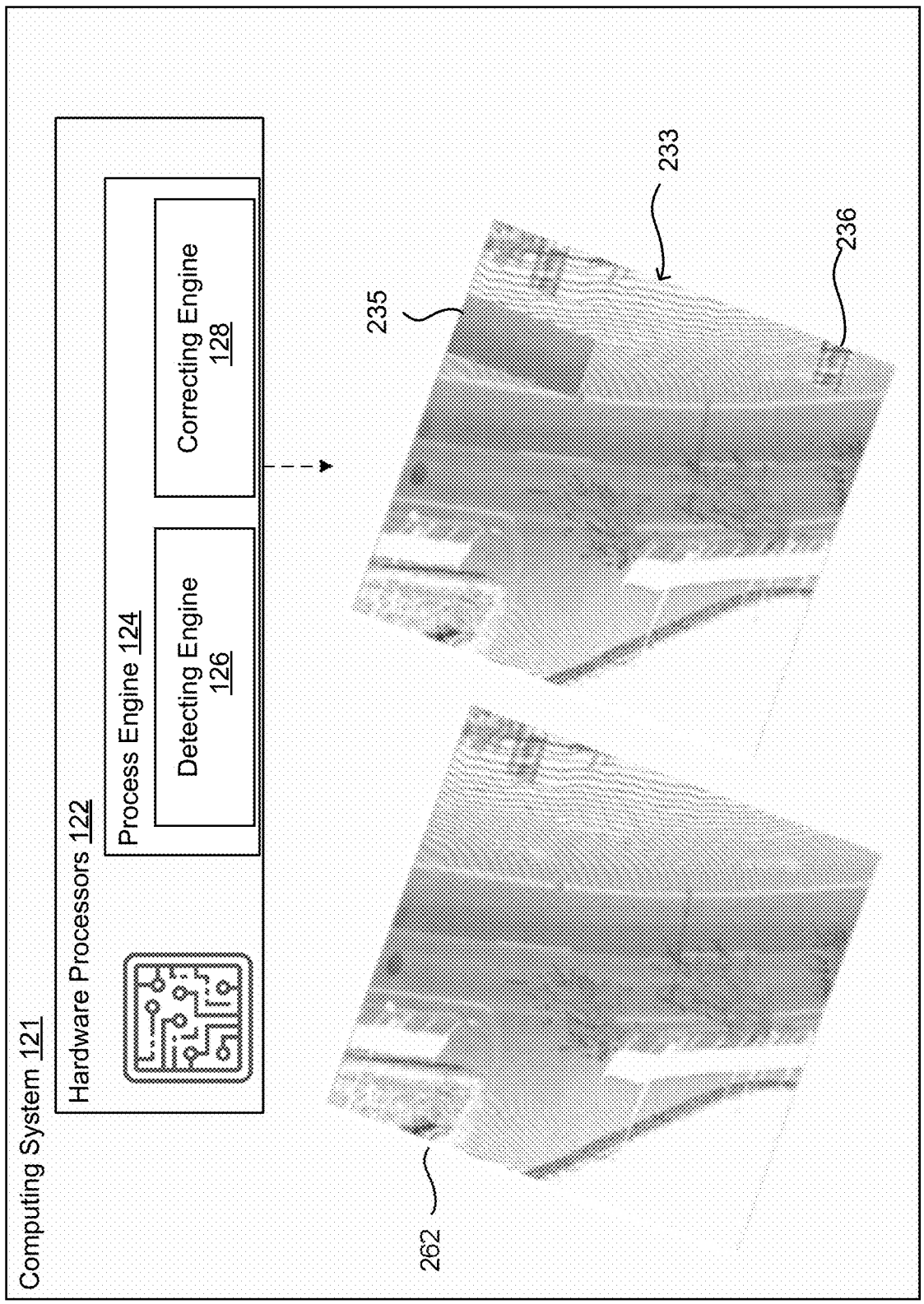

In FIGS. 2C and 2D, the correcting engine 128 may perform point cloud registration on the equivalent point cloud 203 based on point cloud 233, which was obtained from a frame captured by the Lidar sensors 102 of the vehicle 101. During the point cloud registration, the equivalent point cloud 203 and the point cloud 233, which are initially unaligned and have different origins, are registered by a rigid transformation of the equivalent point cloud 203. The rigid transformation may include a translation, rotation, and/or scaling of the equivalent point cloud 203 to align with the point cloud 233 as closely as possible. Here, the point cloud 233 may be a source, and the equivalent point cloud 203 may be a target, or a point cloud that is transformed to be aligned with the point cloud 233. Following a transformation of the equivalent point cloud 203, a transformed equivalent point cloud 262 may be aligned with the point cloud 233. Outliers and background data from any of the equivalent point cloud 203, the point cloud 233, and/or the transformed equivalent point cloud 262 may be detected and filtered following an initial transformation, and following removal of outliers and background data, further transformation may be performed if necessary.

The registration may include determining an equivalent pose of the equivalent point cloud 203. The equivalent pose may estimate or represent a hypothetical pose of a vehicle, such as the vehicle 101, in the event that the vehicle were to actually capture the equivalent point cloud 203. The equivalent pose may be determined as a function of a transform vector and a determined or estimated pose of the vehicle 101 corresponding to the point cloud 233. The determined or estimated pose corresponding to the point cloud 233 may be a pose of the vehicle 101 at the time that the vehicle 101 captured the point cloud 233. In some examples, if data from the point cloud 233 is combined from numerous point clouds (such as, the point cloud 132 and the second point cloud 133) that are registered with one another, the determined or estimated pose may be estimated by an average pose at times of capture of the numerous point clouds.

Once the equivalent pose is determined, constraints between the equivalent point cloud 203 and the point cloud 233 may be incorporated. The constraints may include constraints at the time of capture of the point cloud 233, and further account for the equivalent pose, and relative differences between the equivalent pose and the determined or estimated pose of the vehicle 101 corresponding to the point cloud 233. The constraints may also include a loop closure constraint between the point cloud 233 and the equivalent point cloud 203 because they represent common locations. These constraints may be used to perform the registration of the equivalent point cloud 203.

Following the transformation, the correcting engine 128 in FIG. 2D may identify one or more features in the transformed equivalent point cloud 262 that require updating by comparison to the point cloud 233. For example, the correcting engine 128 may identify a road 235 and a building 236 that is not present in the transformed equivalent point cloud 262, but is present in the point cloud 233. The correcting engine 128 may add such features to the transformed equivalent point cloud 262, and convert the transformed equivalent point cloud 262 back to its original map format so that the map is updated. The correcting engine 128 may determine or confirm an accuracy of the updated map by comparing coordinates of common features between the updated map and the portion 202.

Figure 3A:
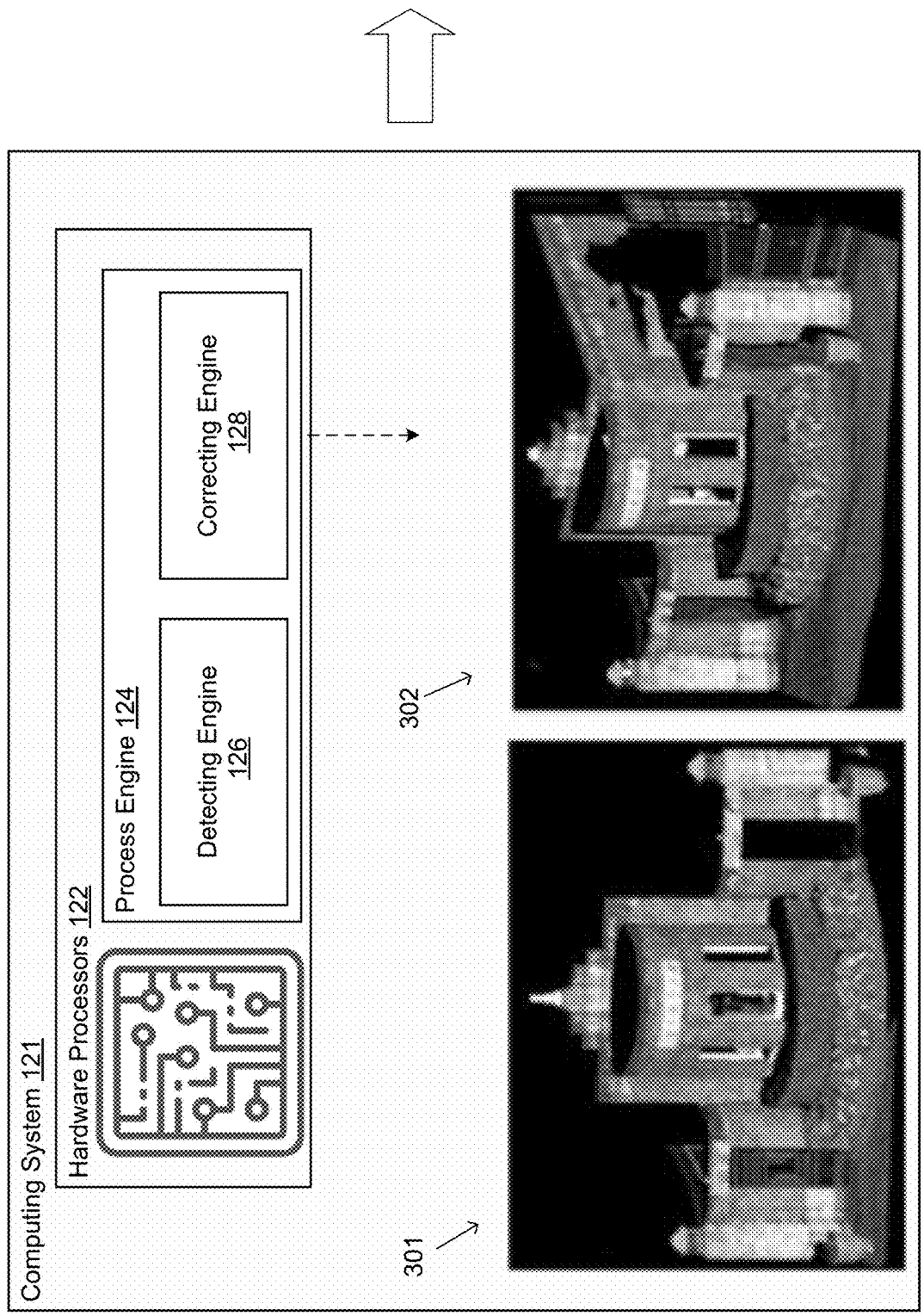
FIGS. 3A-3B and 4A-4B illustrates an implementation of the computing system shown in accordance with FIGS. 1A-1B and 2A-2D, in accordance with an example embodiment of the present disclosure. In particular.
Figure 3B:
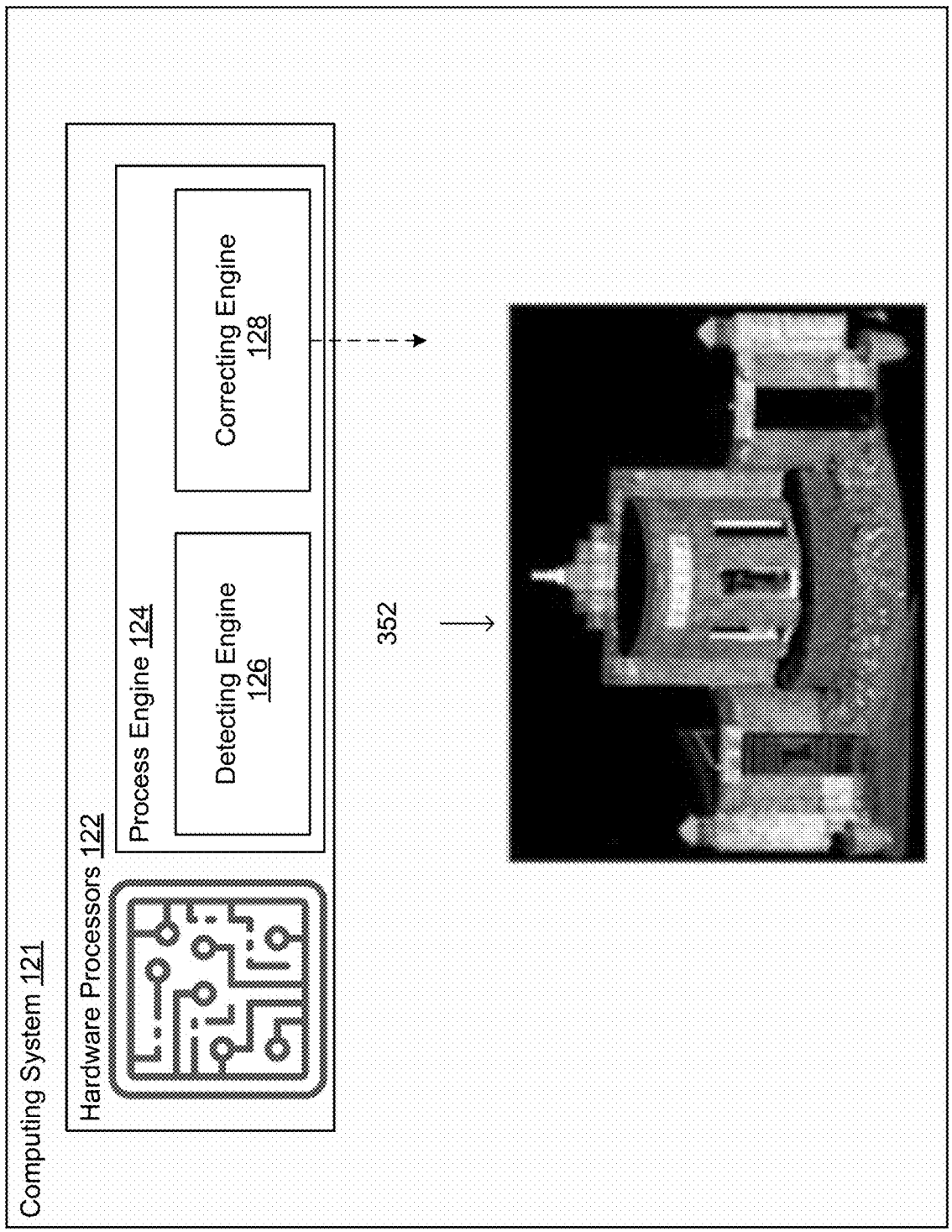

A further illustration of the point cloud registration process is shown in FIGS. 3A, 3B, 4A, and 4B. In FIG. 3A, point clouds 301 and 302, which may be implemented as the point cloud 233 and the equivalent point cloud 203, respectively, are initially unaligned and have different origins. Additionally, the point cloud registration process may also be applicable to registration of point clouds captured by Lidar sensors of the vehicle 101, such as, the point cloud 132 and the second point cloud 133. In FIG. 3A, the point clouds 301 and 302 are registered by a rigid transformation of the point cloud 302. The rigid transformation may include a translation and rotation of the point cloud 302 to align with the point cloud 301 as closely as possible, according to constraints such as loop closure constraints. Here, the point cloud 301 may be a source, or an earlier point cloud, and the point cloud 302 may be a target, or a later point cloud that is transformed to be aligned with the point cloud 301. Following a transformation of the point cloud 302, a transformed point cloud 352 may be aligned with the point cloud 301, as shown in FIG. 3B. Outliers and background data from one or both of the point clouds 301 and 302 may be detected and filtered following an initial transformation, and following removal of outliers and background data, the registration process may be repeated.

Figure 4A:
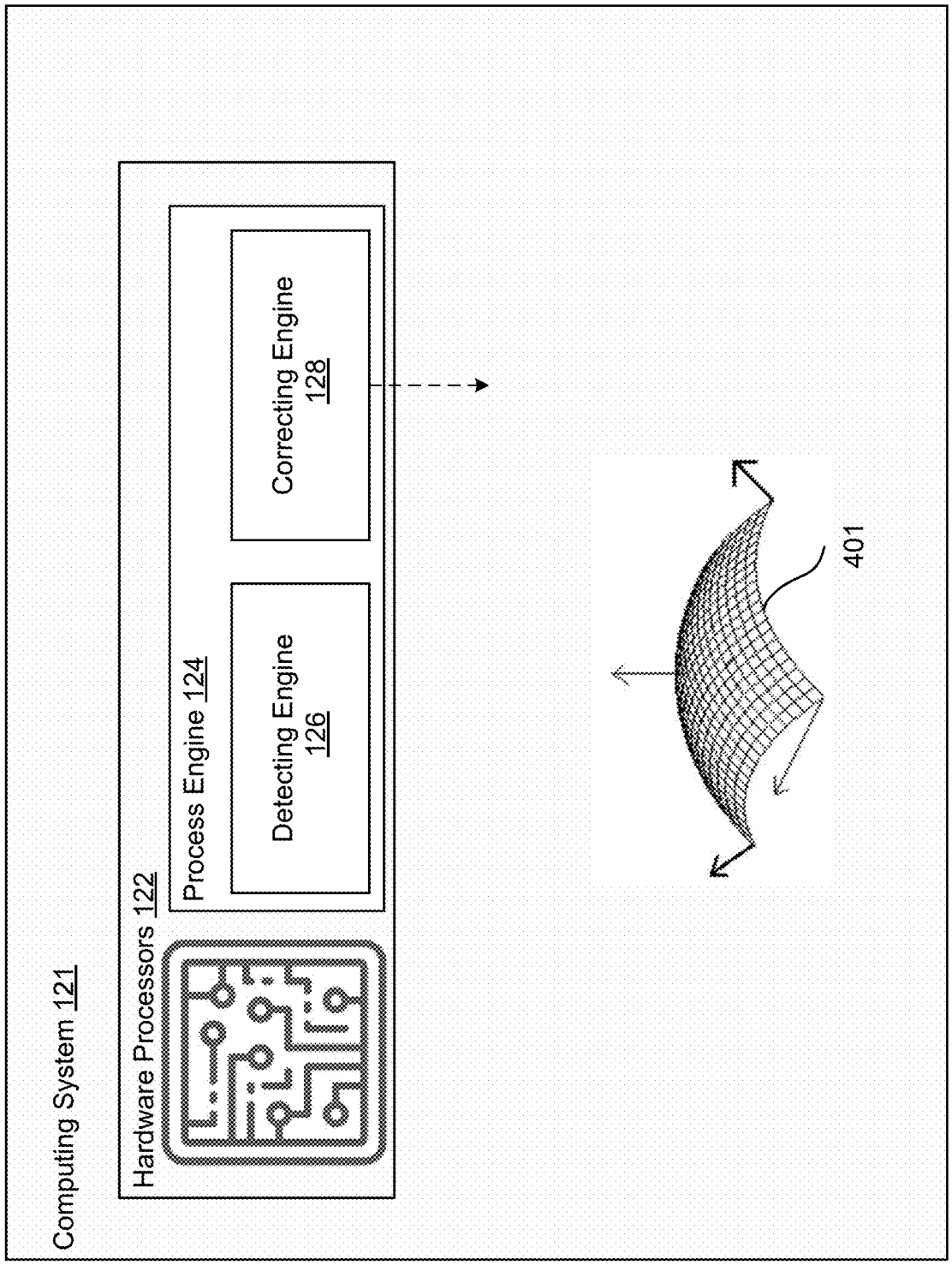
Figure 4B:
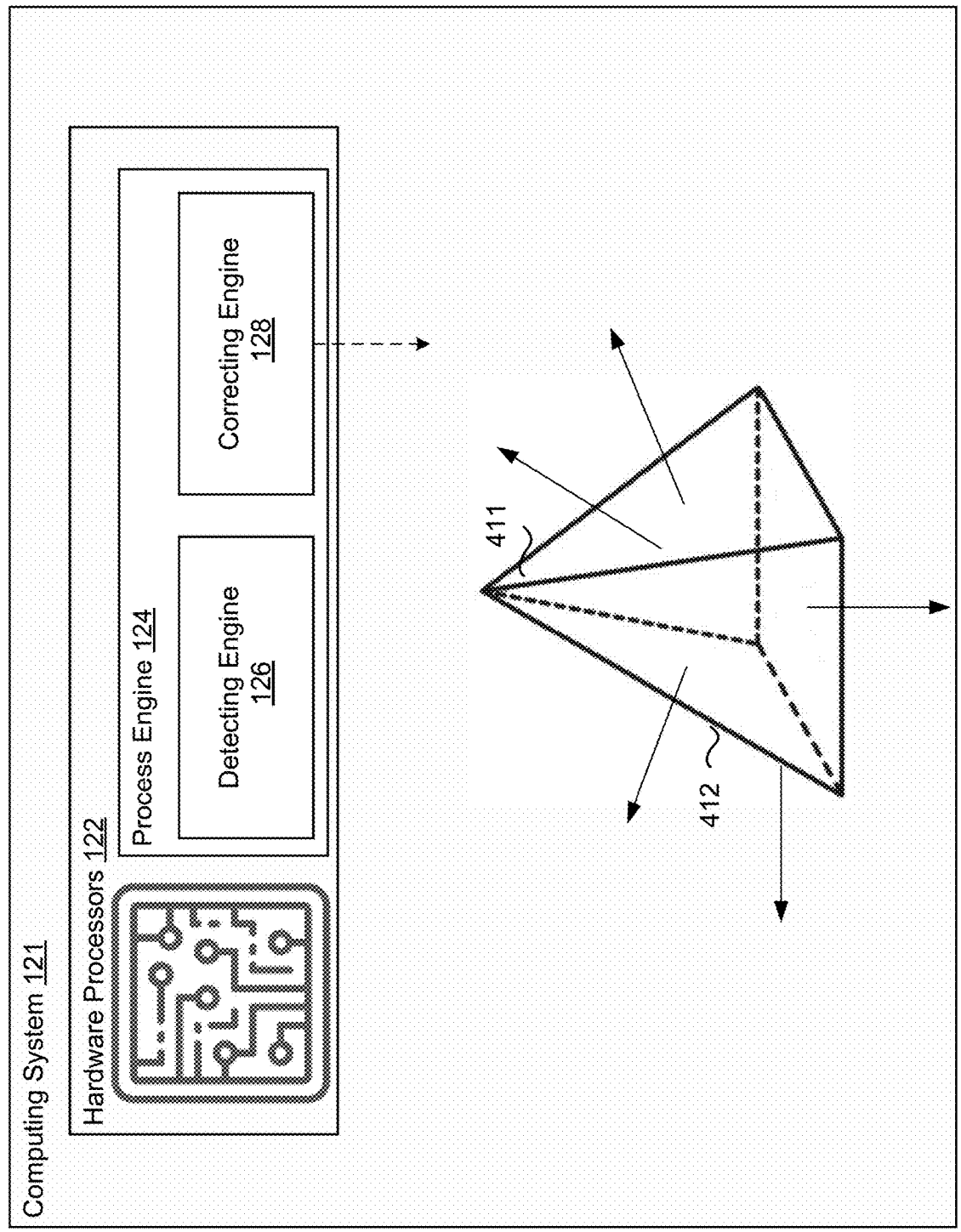

The point cloud registration process, as carried out, may maintain speed and simplicity to conserve processing resources while also accounting for outliers, measurement noise, and other probabilistic techniques to enhance robustness. The process may include estimating a surface normal of each point in a point cloud, as shown in FIGS. 4A and 4B. Here, a normal to each point of Lidar data is considered, and a distribution of each point relative to its neighbors is considered. Here, for each point of Lidar data, a normal to an estimated surface that the point belongs to may be obtained. The surface may be a curved surface, such as 401, as shown in FIG. 4A, or one or flat surfaces 411, as shown in FIG. 4B. In some embodiments, a point may lie on an edge or a corner, such as an edge 412. In such a scenario, the surface normal may be determined to be a same as a surface normal of a nearest neighboring point, or, an average, such as a weighted average, between surface normals of two nearest neighboring points. Estimating a surface normal of each point may improve a rate of convergence to a solution. A category of the entire point cloud may be determined based on a degree to which the point cloud is self-repetitive, which may indicate a frequency or degree to which features in the point cloud repeat. In some embodiments, the categories may include, a flat surface, a pole, or not falling under any specific feature (e.g., uncategorized). The categories may include, ground, road surface, high vegetation, a building, and a human made object. As another example, categories may include bare earth, ground, top of canopy, and water. The categories may define a type of object or entity that has reflected a laser pulse from the Lidar sensor. If the point cloud has a high degree of self-repetitiveness such as, in tunnels, where the obtained point clouds are similar regardless of a location of point cloud capture, parameters that regulate the determination of a potential loop closure candidate may be tightened, compared to corresponding parameters in regions of lower self-repetitiveness, to reduce a possibility of mistaken determinations of loop closures. Certain previous potentially detected loop closures may be discarded. Next, a category of each point in the point cloud may be classified, based on a surface normal and an associated singular value of the surface normal. In particular, for each point in the point cloud, geometric neighbors of the point are obtained. A covariance matrix may be determined based on these neighbor points and the point. An eigen decomposition (EVD) of the point may be determined. This process is known as principal component analysis (PCA). The eigen decomposition will yield eigenvalues, which is synonymous with the singular value obtained from singular value decomposition (SVD) because of the symmetric nature of the covariance matrix. However, performing an EVD may be less computationally expensive. Based on features of the eigenvalues, for example, relative values of the eigenvalues, the point may be classified as a flat surface, a pole, or not belonging to a specific category.

The point cloud registration process includes an iterative process that is repeated until convergence. For each point from a source point cloud, a corresponding closest point in a target point cloud may be selected. The point from the source point cloud and the closest point are required to have a same category, or else, that pair is discarded and another point from the source point cloud and a closest point in the target point cloud are selected. For a point from the source point cloud and a corresponding closest point in the target point cloud having matching categories, a mahalanobis distance may be determined between the two points based on the surface normal of the source point cloud. Cost functions may be determined based on the determined mahalanobis distance and based on the determined or estimated range accuracy of the point from the source point cloud and/or the target point cloud. A solution to minimize the cost functions may be obtained by adjusting position and attitude parameters of the source point cloud relative to an origin. In some examples, the origin may be a rear-axis of the vehicle, and an attitude is defined to be a same as an attitude of the vehicle. The origin and the axes, however, can be defined in other manners, such as an origin of the Lidar sensor, or an origin of a navigation-box of the vehicle. Defining different origins will yield different coordinates of the source point cloud. The iterative process converges when an amount of adjustment or change in the position and the attitude parameters between successive iterations differs by less than a threshold.

For each of the loop closure, odometry, and other constraints, a corresponding cost function may be determined. Parameters associated with a position and an attitude of associated point clouds such that the cost function is optimized and convergent may be determined. When a cost function is optimized, the corresponding constraint may be satisfied. Next, further refinement to the parameters may be carried out. For example, if a constraint cannot be satisfied or minimized, such a constraint may be removed based on a self-adaption threshold of an actual cost, iterations of repetition, and differences in Euclidean distance. Furthermore, loop closure constraints may be added in regions of which a degree of self-repetition (a frequency or number of repeated features) is greater than a threshold, while avoiding points that have been previously removed. In particular, a previous process of tightening the parameters in self-repetitive regions may cause points to become detached from the pose graph and misalignment among points. For those detached or misaligned points, the correcting engine 128 may attempt to add constraints. The constraints may be from loop closure or from other sources such as GNSS-IMU post processing. The parameters may be further refined based on the newly removed and added constraints. Constraints may continue to be removed until a number of constraints that cannot be minimized is smaller than a threshold, at which point the process is considered to converge.

Figure 5:
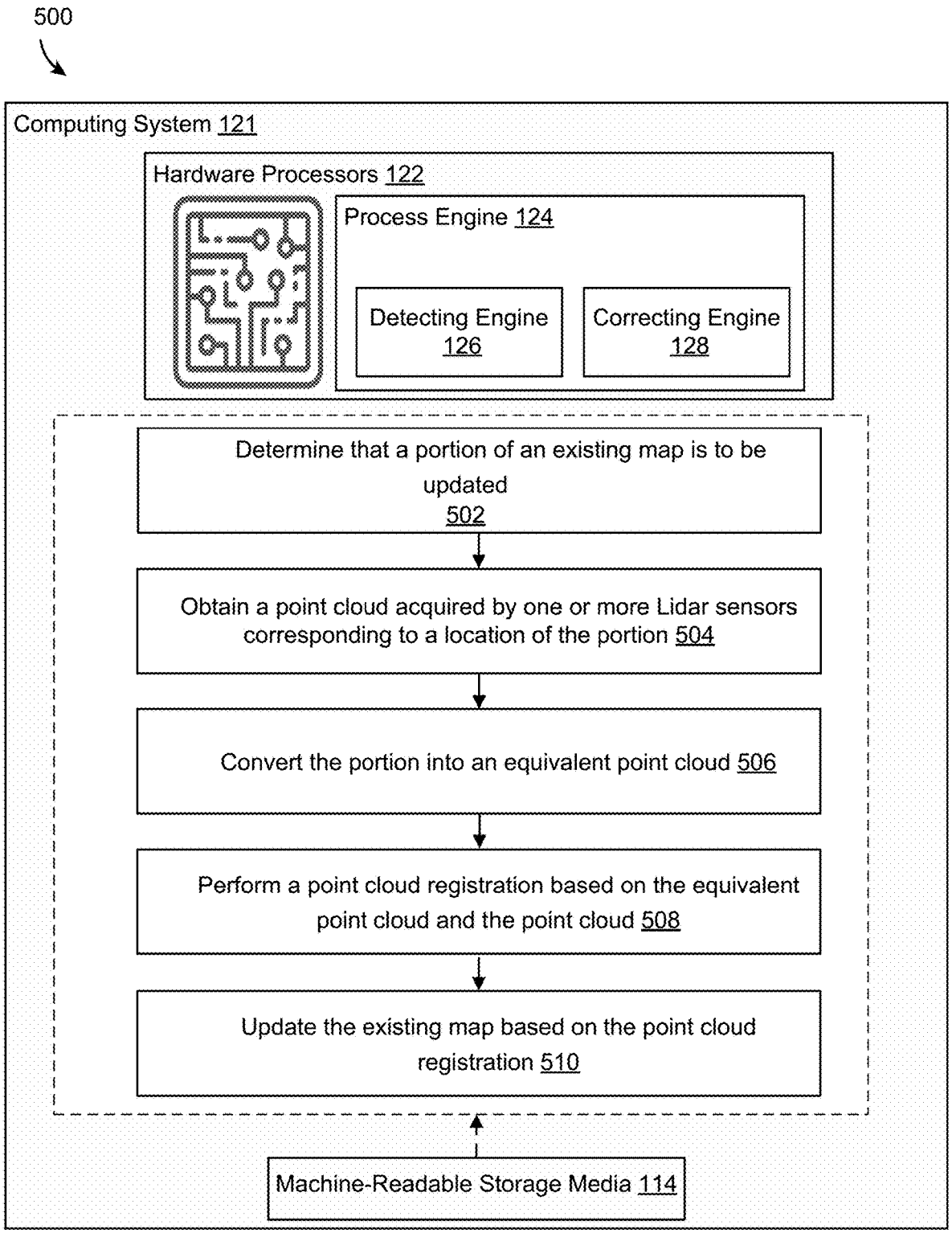
FIG. 5 illustrates a flowchart of a mapping method, in accordance with an example embodiment of the present disclosure.

FIG. 5 illustrates a flowchart of a method of updating an existing map, according to an example embodiment of the present disclosure. The description from other figures may also be applicable to FIG. 5. Any or all of the steps may be implemented by a hardware processor of a vehicle or remote from the vehicle. In step 502, one or more hardware processors such as the hardware processors 122 may determine that a portion of an existing map is to be updated. In step 504, one or more processors may obtain a point cloud acquired by one or more Lidar sensors corresponding to a location of the portion. In step 506, one or more processors may convert the portion into an equivalent point cloud. In step 508, one or more processors may perform a point cloud registration based on the equivalent point cloud and the point cloud. In step 510, one or more processors may update the existing map based on the point cloud registration.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 6:
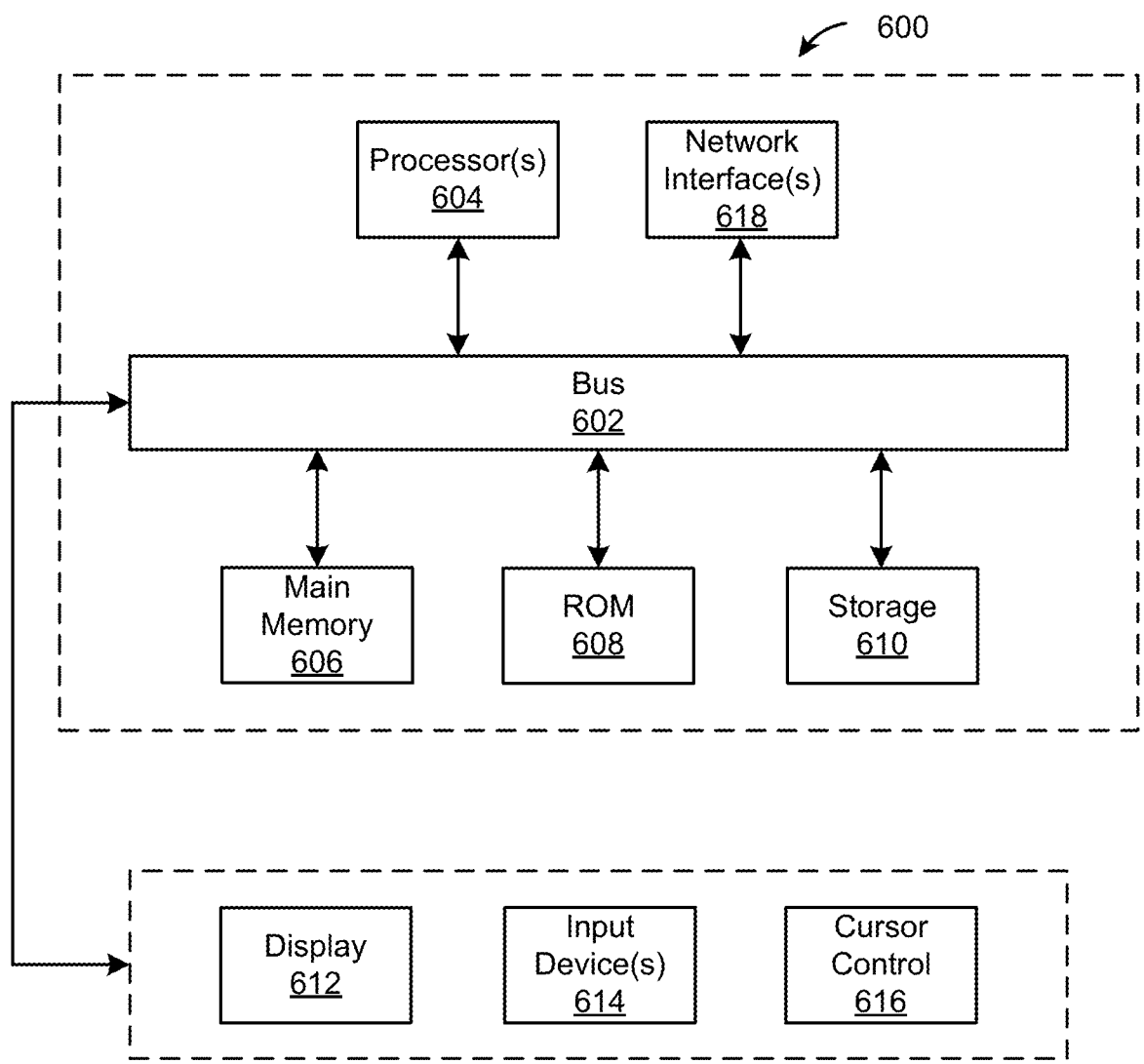
FIG. 6 illustrates a block diagram of a computer system upon which any of the embodiments described herein may be implemented.

FIG. 6 illustrates a block diagram of a computer system 600 upon which any of the embodiments described herein may be implemented. For example, the computing system 121 may be implemented as the computer system 600. The computer system 600 includes a bus 602 or other communication mechanism for communicating information, one or more hardware processors 604 coupled with bus 602 for processing information. A description that a device performs a task is intended to mean that one or more of the hardware processor(s) 604 performs that task. The hardware processor(s) 604 may be hard-wired to perform techniques described in the Specification; they may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The hardware processor(s) 604 may also combine custom hard-wired logic, ASICs, or FPGAs with custom programming to accomplish the techniques. The hardware processor(s) 604 can include any suitable processing unit capable of accepting data as input, processing the input data in accordance with stored computer-executable instructions, and generating output data. The hardware processor(s) 604 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the hardware processor(s) 604 can have any suitable microarchitecture design that includes any number of constituent components such as, for example, registers, multiplexers, arithmetic logic units, cache controllers for controlling read/write operations to cache memory, branch predictors, or the like. The microarchitecture design of the hardware processor(s) 604 can be made capable of supporting any of a variety of instruction sets.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to output device(s) 612, such as a cathode ray tube (CRT) or LCD display (or touch screen), for displaying information to a computer user. Input device(s) 614, including alphanumeric and other keys, are coupled to bus 602 for communicating information and command selections to processor 604. Another type of user input device is cursor control 616. The computer system 600 also includes a communication interface 618 coupled to bus 602.

The term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances.

Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

The invention claimed is:

1. A computing system configured to modify an existing map, the computing system comprising:
  one or more processors; and
  a memory storing instructions that, when executed by the one or more processors, cause the system to perform:
    determining that a portion of an existing map is to be updated;
    obtaining a point cloud acquired by one or more Lidar sensors corresponding to a location of the portion;
    converting the portion into an equivalent point cloud;
    performing a point cloud registration based on the equivalent point cloud and the point cloud, wherein the point cloud registration comprises:
      estimating a surface normal of each point in the equivalent point cloud and the point cloud;
      determining a category of the point cloud and the equivalent point cloud, wherein the category is indicative of a degree to which the point cloud and the equivalent point cloud are self-repetitive;
      selectively adjusting constraints associated with the point cloud registration based on the category;
      determining a category of each point in the point cloud and the equivalent point cloud based on the surface normal; and
      for each point in the point cloud and the equivalent point cloud having a common category, determining a position or an attitude associated with the point cloud and the equivalent point cloud based on a cost function; and
    updating the existing map based on the point cloud registration.

2. The computing system of claim 1, wherein the performing of the point cloud registration further comprises:
  determining a rigid transformation to be performed on the equivalent point cloud, the rigid transformation including a rotation and a translation to form a closest alignment, out of all possible alignments, between the equivalent point cloud and the point cloud.

3. The computing system of claim 1, wherein the existing map comprises a static map, the static map including cells arranged in tiles; and
  the conversion of the portion into an equivalent point cloud comprises:
    representing each occupied point in the tiles as a point in a frame of the equivalent point cloud.

4. The computing system of claim 3, wherein the conversion of the portion into an equivalent point cloud comprises:
  combining the tiles and neighboring tiles into the frame.

5. The computing system of claim 1, wherein the instructions further cause the one or more processors to perform:
  determining an equivalent pose of the portion; and the performance of the point cloud registration is based on the equivalent pose.

6. The computing system of claim 1, wherein, the equivalent point cloud comprises an array; and the instructions further cause the one or more processors to perform:
  in response to converting the portion into an equivalent point cloud, dynamically allocating a memory based on a size of the equivalent point cloud; and
  storing the equivalent point cloud into the memory.

7. The computing system of claim 1, wherein the determination that a portion of an existing map is to be updated comprises:
  detecting a difference in a feature between the portion and sensor data of a corresponding location, the sensor data comprising Lidar, camera, or radar data; and
  determining that the difference exceeds a threshold amount.

8. The computing system of claim 1, wherein the instructions further cause the one or more processors to perform:
  obtaining a second point cloud acquired by the one or more Lidar sensors corresponding to the location of the portion;
  performing a second point cloud registration between the point cloud and the second point cloud to obtain a second registered point cloud; and wherein:
  the performing of the point cloud registration is between the second registered point cloud and the equivalent point cloud.

9. The computing system of claim 1, wherein the instructions further cause the system to perform:
  fusing odometry data from an inertial measurement unit (0) and a global position satellite (GPS) to the point cloud, wherein the odometry data comprises constraints indicating a position and an attitude of a vehicle at a time the point cloud was acquired; and wherein the performing of the point cloud registration is based on the point cloud fused with the odometry data.

10. A computer-implemented method, comprising:
  determining that a portion of an existing map is to be updated;
  obtaining a point cloud acquired by one or more Lidar sensors corresponding to a location of the portion;
  converting the portion into an equivalent point cloud;
  performing a point cloud registration based on the equivalent point cloud and the point cloud, wherein the point cloud registration comprises:
    estimating a surface normal of each point in the equivalent point cloud and the point cloud;
    determining a category of the point cloud and the equivalent point cloud, wherein the category is indicative of a degree to which the point cloud and the equivalent point cloud are self-repetitive;
    selectively adjusting constraints associated with the point cloud registration based on the category;
    determining a category of each point in the point cloud and the equivalent point cloud based on the surface normal; and
    for each point in the point cloud and the equivalent point cloud having a common category, determining a position or an attitude associated with the point cloud and the equivalent point cloud based on a cost function; and
  updating the existing map based on the point cloud registration.

11. The computer-implemented method of claim 10, wherein the performing of the point cloud registration further comprises:
  determining a rigid transformation to be performed on the equivalent point cloud, the rigid transformation including a rotation and a translation to form a closest alignment, out of all possible alignments, between the equivalent point cloud and the point cloud.

12. The computer-implemented method of claim 10, wherein the existing map comprises a static map, the static map including cells arranged in tiles; and the conversion of the portion into an equivalent point cloud comprises:

representing each occupied point in the tiles as a point in a frame of the equivalent point cloud.

13. The computer-implemented method of claim 12, wherein the conversion of the portion into an equivalent point cloud comprises:

combining the tiles and neighboring tiles into the frame.

14. The computer-implemented method of claim 10, further comprising: determining an equivalent pose of the portion; and the performance of the point cloud registration is based on the equivalent pose.

15. The computer-implemented method of claim 10, wherein, the equivalent point cloud comprises an array; and further comprising:

in response to converting the portion into an equivalent point cloud, dynamically allocating a memory based on a size of the equivalent point cloud; and storing the equivalent point cloud into the memory.

16. The computer-implemented method of claim 10, wherein the determination that a portion of an existing map is to be updated comprises:

detecting a difference in a feature between the portion and sensor data of a corresponding location, the sensor data comprising Lidar, camera, or radar data; and determining that the difference exceeds a threshold amount.

17. The computer-implemented method of claim 10, further comprising:

obtaining a second point cloud acquired by the one or more Lidar sensors corresponding to the location of the portion;

performing a second point cloud registration between the point cloud and the second point cloud to obtain a second registered point cloud; and wherein:

the performing of the point cloud registration is between the second registered point cloud and the equivalent point cloud.

18. A non-transitory computer readable medium comprising instructions that, when executed, cause one or more processors to perform:

determining that a portion of an existing map is to be updated;

obtaining a point cloud acquired by one or more Lidar sensors corresponding to a location of the portion;

converting the portion into an equivalent point cloud;

performing a point cloud registration based on the equivalent point cloud and the point cloud, wherein the point cloud registration comprises:

estimating a surface normal of each point in the equivalent point cloud and the point cloud:

determining a category of the point cloud and the equivalent point cloud, wherein the category is indicative of a degree to which the point cloud and the equivalent point cloud are self-repetitive;

selectively adjusting constraints associated with the point cloud registration based on the category;

determining a category of each point in the point cloud and the equivalent point cloud based on the surface normal; and for each point in the point cloud and the equivalent point cloud having a common category, determining a position or an attitude associated with the point cloud and the equivalent point cloud based on a cost function; and updating the existing map based on the point cloud registration.

19. The non-transitory computer readable medium of claim 18, wherein the existing map comprises a static map, the static map including cells arranged in tiles; and the conversion of the portion into an equivalent point cloud comprises:

representing each occupied point in the tiles as a point in a frame of the equivalent point cloud.

20. The non-transitory computer readable medium of claim 19, wherein the conversion of the portion into an equivalent point cloud comprises:

combining the tiles and neighboring tiles into a single frame.

* * * * *